April 29, 1924. 1,492,082
W. NOBLE
FRICTION BRAKE
Filed Feb. 26, 1919 2 Sheets-Sheet 1

Inventor
Warren Noble
by *[signature]*
Attorneys

April 29, 1924.

W. NOBLE

FRICTION BRAKE

Filed Feb. 26, 1919   2 Sheets-Sheet 2

1,492,082

Inventor
Warren Noble
by Wright Brown Quinby & May
Attorneys

Patented Apr. 29, 1924.

1,492,082

UNITED STATES PATENT OFFICE.

WARREN NOBLE, OF PROVIDENCE, RHODE ISLAND, ASSIGNOR, BY MESNE ASSIGNMENTS, TO WILLIAM H. THORNLEY, OF PROVIDENCE, RHODE ISLAND.

FRICTION BRAKE.

Application filed February 26, 1919. Serial No. 279,382.

*To all whom it may concern:*

Be it known that I, WARREN NOBLE, a subject of the King of Great Britain, residing at Providence, in the county of Providence and State of Rhode Island, have invented new and useful Improvements in Friction Brakes, of which the following is a specification.

Figure 1:
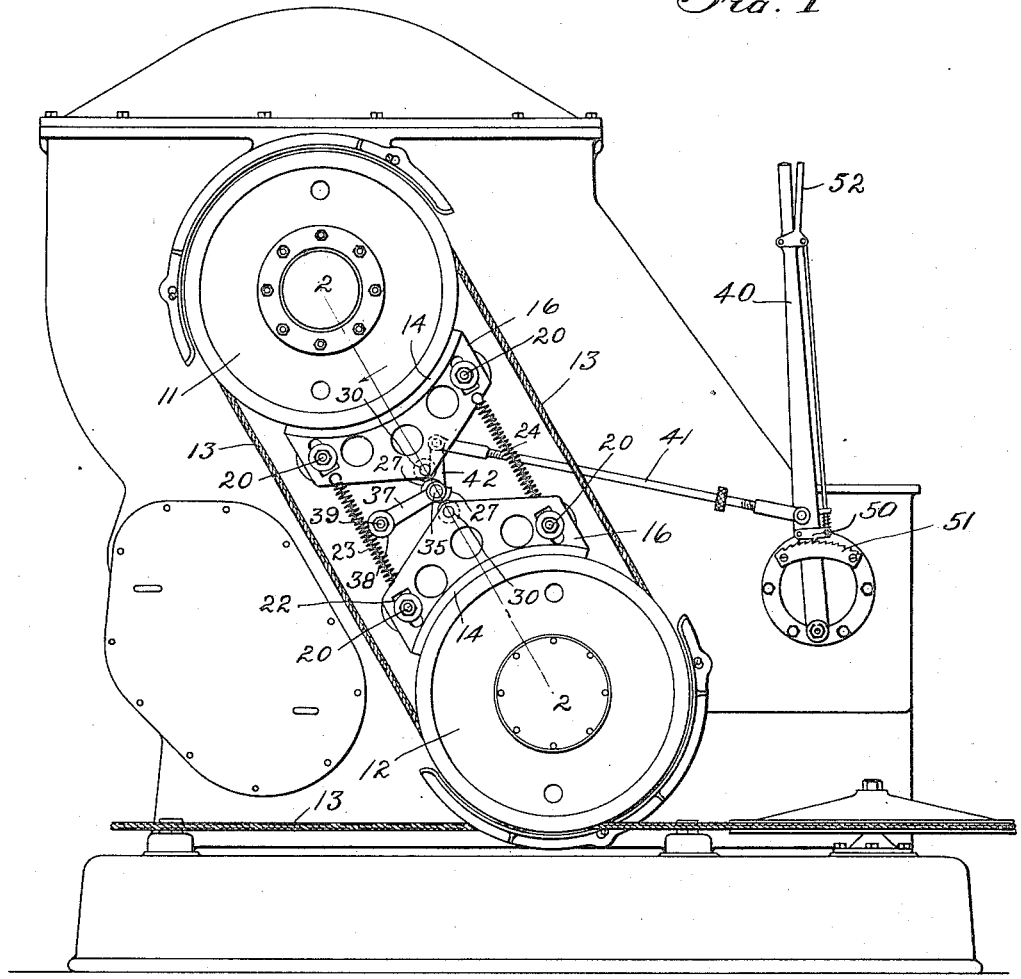
Figure 6:
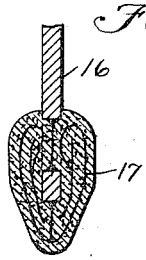
Figure 5:
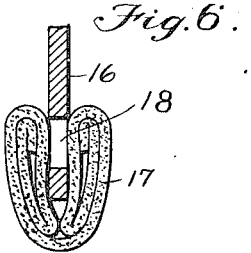
Figure 7:
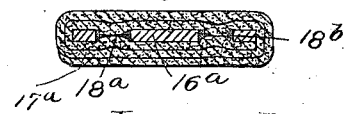
Figure 2:
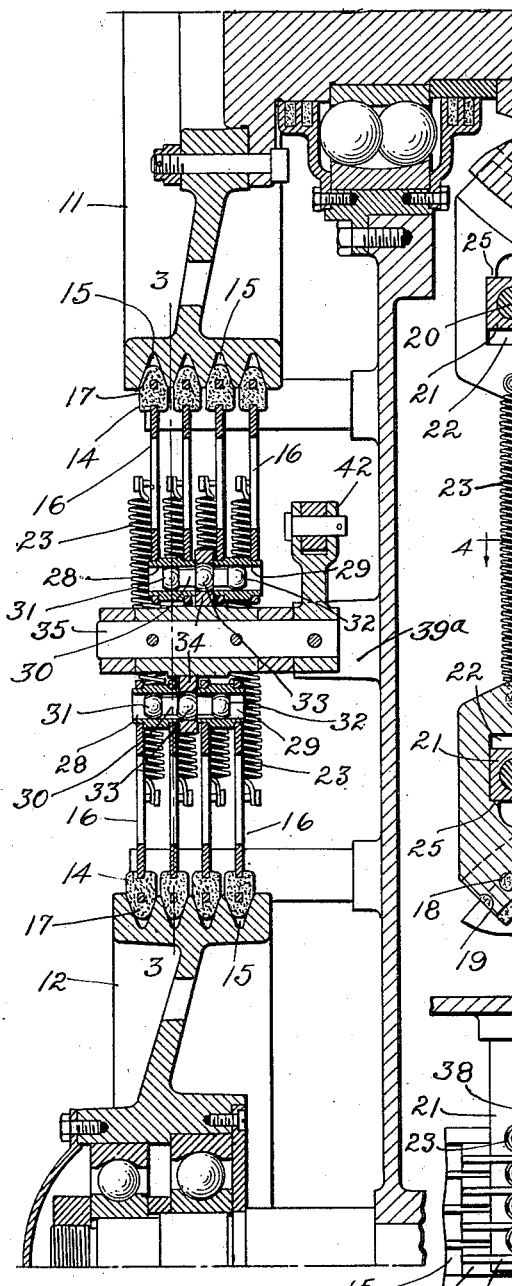
Figure 3:
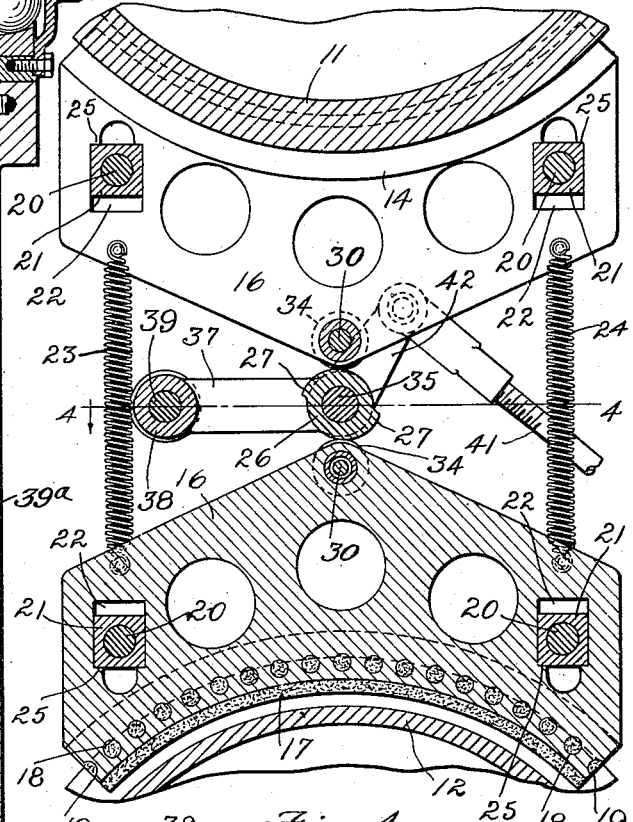
Figure 4:
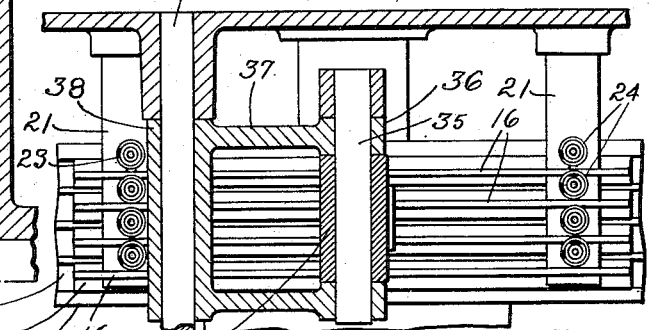

The present invention relates to friction brakes adapted to resist the rotation, and motions of other characters, in moving parts. The invention resides in part in certain novel principles of a brake shoe, and in the constructions embodying such principles adapted to various forms and uses, and in part also in a brake mechanism including brake shoes embodying said principles with wheels or drums on which such shoes act and the means for operating them. The precise nature of the invention and the principles which it contains appear from the following detailed description of a satisfactory embodiment thereof in connection with the drawings which form a part of this specification. In the drawings, Figure 1 is an end view of a winch having my novel and improved brake shoes and operating mechanism therefor applied to it. Figure 2 is a view on an enlarged scale shown in section taken on the line 2—2 of Figure 1. Figure 3 is a sectional view of brake mechanism taken on line 3—3 of Figure 2. Figure 4 is a cross section on line 4—4 of Figure 3. Figure 5 is a detail cross sectional view of one of the brake shoes. Figure 6 is a similar view showing the shoe in a preliminary stage of its manufacture. Figure 7 is a sectional view showing another form of brake shoe embodying the same principles and operable by the same operating means as well as by other means.

The same reference characters indicate the same parts in all the figures.

In the drawings 11 and 12 represent two drums of a winch, being technically known as surge drums, each such drum having a number of peripheral grooves to receive wraps or turns of the cable which is controlled by the winch. 13 represents the cable, which is shown as being passed to and around the drums in alternate succession in a number of wraps.

A brake for stopping and retarding the rotation of these surge drums is here shown as consisting of brake shoes 14 arranged in two sets, each set coacting with one of the drums, and each including a number of shoes adapted and arranged to enter the several cable-receiving grooves 15 of the drums and to apply frictional pressure against the sides of such grooves. Each brake shoe is composed of a plate 16 and a facing 17 of frictional material which is so applied to an edge of the plate that such edge is embedded in the facing and provides in effect a core for the same.

Describing further the characteristics of the brake, or the individual brake shoe, I would say that that part of the plate or core which is embraced by the frictional facing material is provided with a number of holes 18 placed in a line or series rather near together and also near to the edge which is embraced by the frictional material. Such frictional material may be of various characteristics and descriptions. I prefer to use for the purpose a woven fabric which has a high coefficient of friction, strength, and resistance to the effects of heat and wearing. Such fabrics as those used in the manufacture of the brake bands which are sold under the trade names of Thermoid and Raybestos are suitable for the purpose. They are loosely woven textile fabrics of which the yarns contain cotton and asbestos fibers, with fine wires to give strength, and are coated or impregnated to a greater or less extent with vulcanizable rubber composition, or other composition adapted to be set and cured by heat, and being sticky prior to such curing. A strip of this material is folded double one, two, or more times along each edge, and then bent around the edge of the core plate as illustrated in Figure 6. The edge of the plate with the strip thus enclosing it is then placed in a mold and confined under high pressure, while being at the same time subjected to the heat necessary for the curing process. Under the effect of pressure the layers or plies of the woven fabric are squeezed tightly together, and those parts which lie across the holes 18 are offset into such holes at opposite sides until they meet, while the exterior of the material is shaped to the required form, that is the form which enables it to fit the drum or other part with which the brake is designed to coact. For the particular use here shown the sides of the frictional facing are conformed to the sides of the grooves in the cable drums. The effect of heat upon the material is to cure and set the previously plastic and sticky rubber, or other impregnating composition, substantially as vulcanizable rubber compositions are commonly vulcanized by heat. Resulting from this process is a brake shoe having a frictional facing which embraces, and enters the holes within, the core portion, and is bonded together within such holes, forming so far as the bonding material is concerned, a substantially homogeneous mass and anchored securely by those substantially integral parts which pass into the holes. The vulcanizable material likewise adheres to the sides of the plate between and around the holes, and is firmly united thereto by the vulcanizing process.

Another form of brake embodying the principles last described is shown in Figure 7, where the metal plate or core 16$^a$ is a plate or band adapted to be laid flatwise on or around a flat surface or a drum. The frictional facing is laid entirely across one surface of the core, and around both opposite edges thereof; being folded and doubled in a manner similar to that shown in Figure 6, or permissibly wrapped several times around and around the core. This form of core has holes 18$^a$ and 18$^b$ into which the frictional material is pressed and by the engagement of which with such material the latter is securely anchored.

At the ends of the shoe incomplete holes 19 are provided so that the facing material lying at opposite sides of these ends will be there united; the union at these points preventing a separation of the bodies of frictional material lying at opposite sides of the plate from being started at the ends.

The plates 16 here shown are not only the cores and holders for the frictional material but are also means by which pressure is applied to crowd the faces of the brake shoes against the drums. Each set of brake shoes is placed between the drum on which it acts, and the other drum, whereby the plates of both sets approach near to one another. They are guided by studs 20 which project from a stationary frame or supporting part beside the drums and carry guides 21 which occupy guideways 22 in the brake plates. Thus the brake shoes are prevented from being dragged out of position by the friction of the rotating drums, while they are capable of moving toward and away from their respective drums in being set and relaxed. Springs 23, 24 are connected with the approximately alined brake shoes in different sets, whereby to tend to withdraw the brakes from the drums, each of the brake shoes so connected together being the abutment against which the springs react to retract the other brake shoe. However, there are shoulders 25 at the ends of the guideways 22 nearer to the respective brake drums whereby to arrest the retractive movements of the brakes and so exclude possibility of all of such movement being given to one of two connected brakes.

For setting the brakes I provide a cam 26 having diametrically opposite eccentric pressure surfaces 27, each of which applies pressure to all the brake shoes of one set through a pressure equalizing contrivance which I will now describe. Each of the before described sets comprises four shoes, which are conveniently separable into two pairs. The shoes of one pair support the ends of a tube or thimble 28 and those of the other pair similarly support a like thimble 29, said thimbles being loosely received in suitable holes in the plates and having shoulders which limit their entrance into such holes, as shown in Figure 2, so that they will not shift endwise out of place. Then partly contained in each thimble and partly between them is a bar 30 terminating at its opposite ends in enlarged knobs 31 and 32, the surfaces of which are substantially spherical segments while the centers of such surfaces are midway between the plates. In the center of the bar is an enlargement 33, also with a spherical external surface which is too large to enter the thimbles, wherefore the bar is retained thereby and by the thimbles in its required location. A roller 34 is mounted on the last named enlargement, the spherical curvature of which permits the bar to tilt within the roller.

It will now be understood that, each set of brake shoes being equipped with such pressure equalizing apparatus, when the cam is turned to apply its rising surfaces against the rollers 34 of both sets, the bar 30 of each set applies equal pressures centrally to both thimbles 28 and 29 of the set, and each thimble applies pressure equally to both brake members with which it is engaged. Thus inequalities in the individual members of each set are compensated for and all are caused to apply equal pressure to the drum; while both sets are equally pressed upon owing to the fact that the cam 26 is supported in a floating manner. It is pinned to a shaft 35 mounted to turn in bearings 36 in the ends of arms 37 which spring from a sleeve 38 mounted rotatably upon a fixed pivot pin or stud 39, which stud is mounted upon the frame and projects from a post 39$^a$, shown in Figure 2. Thus the cam is adapted to shift in either direction according as is necessary to equalize the pressure and reaction applied on the respective sets of brake shoes.

The cam is operated by a lever 40 connected through a link 41, which is adjustable in length, with an arm 42 pinned or otherwise secured upon the cam-holding shaft 35.

This lever 40 is provided with a latch 50 in connection with a fixed toothed quadrant or ratchet bar 51, and controlled by the usual latch trigger 52.

The manner in which its manipulation causes the brake members to be forced against the drums and to be relaxed therefrom is apparent from an inspection of the drawings.

I would point out that the foregoing description of a particular brake mechanism is not intended as a limitation in any sense of my claim to protection for the novel features embodied in the individual brake members or shoes. Such features are hereinafter claimed as applicable for brake members of any desired form and construction applied to use in all combinations and relations in which brakes may be applied.

What I claim and desire to secure by Letters Patent is:

1. A brake member comprising a core or body piece having a series of holes through it, frictional material including woven fabric and a vulcanized composition mingled with such fabric impressed against the opposite faces of said core piece over said holes and into them.

2. A brake member comprising a metal core piece of relatively slight thickness as compared to its width having holes through it, frictional material including in its structure woven fabric and vulcanizable rubber composition laid against the opposite faces of said core over the holes therein, being compressed against such faces and into such holes and vulcanized.

3. A brake member comprising a metal core piece of relatively slight thickness as compared to its width having holes through it, frictional material including in its structure woven fabric and vulcanizable rubber composition laid against the opposite faces of said core over the holes therein, being compressed against such faces and into such holes and vulcanized, such material extending to an edge of the core piece, and the latter having at such edge an open sided recess, into which the overlying parts of the frictional material are pressed and anchored.

4. A brake member comprising a plate and frictional material including woven fabric and a vulcanizable composition wrapped about one edge of the plate and extending to the ends of such edge, the plate having in its ends adjacent to such edge open recesses, and the frictional material being compressed against the opposite sides of the plate and into such recesses, joined together within the recesses, and vulcanized, whereby it is both adhesively secured to the plate and anchored thereto by the extruded portions occupying said recesses.

5. The combination with a pulley having a groove with inclined sides, of a brake shoe consisting of a metal plate having one edge curved complementally to that part of the pulley in which said groove is located, and frictional material secured to said plate to embrace the said edge, having inclined lateral braking surfaces complemental to the sides of the groove.

In testimony whereof I have affixed my signature.

WARREN NOBLE.